March 27, 1962  E. A. JOHNSON  3,026,729
PRESSURE MEASURING AND RECORDING SYSTEM
Filed Nov. 4, 1946  3 Sheets-Sheet 1

Inventor
ELLIS A. JOHNSON

March 27, 1962 E. A. JOHNSON 3,026,729
PRESSURE MEASURING AND RECORDING SYSTEM
Filed Nov. 4, 1946 3 Sheets-Sheet 2

Inventor
ELLIS A. JOHNSON
By M. Hayes
Attorney

March 27, 1962  E. A. JOHNSON  3,026,729
PRESSURE MEASURING AND RECORDING SYSTEM
Filed Nov. 4, 1946  3 Sheets-Sheet 3

Inventor
ELLIS A. JOHNSON

United States Patent Office 3,026,729
Patented Mar. 27, 1962

3,026,729
PRESSURE MEASURING AND RECORDING SYSTEM
Ellis A. Johnson, 419 Essex Ave., Chevy Chase, Md.
Filed Nov. 4, 1946, Ser. No. 707,546
2 Claims. (Cl. 73—398)
(Granted under Title 35, U.S. Code (1952), sec. 266)

This invention relates generally to a pressure measuring and recording system and more particularly to a new and improved electrical system of this character adapted to measure water pressure at any desired depth beneath the ocean surface and record such pressure information.

In the development of pressure mines it was necessary to obtain accurate information regarding the pressure field beneath all classes of ships moving at varying speeds and through water of different depths. Also, pressure changes resulting from wave action and tide changes under various climatical conditions must be known and accounted for in the development of such mines. Conversely, such pressure information is necessary in predetermining safe speeds for friendly ships proceeding against pressure responsive mines of a predetermined sensitivity in water of a known depth.

According to the arrangement of the present invention, a new and improved electrical system is provided for measuring small variations in underwater pressure wherein a pressure responsive diaphragm is adapted to set up flux changes in an electromagnetic circuit, thereby to induce a voltage proportional to the rate of change of the amplitude-time function of the pressure applied to the diaphragm, and wherein a recording fluxmeter is employed to integrate the induced voltage and indicate calibrated pressure readings corresponding to the flux changes measured thereby, these readings being recorded in a well known manner so that the amplitude-time functions of the changes in pressure at a fixed point of reference preferably appear in the form of a graph, hereinafter referred to as a pressure signature.

The aforesaid diaphragm and electromagnetic circuit associated therewith comprise a pressure gauge in the form of an underwater power phone in which an armature carried by the diaphragm is moved thereby within a magnetic field set up by a magnetized core having at least one winding thereon whereby flux changes set up in the core in response to movement of the armature cause the aforementioned voltage proportional to the rate of change of the amplitude-time functions of the underwater pressure applied to the diaphragm to be induced in the coil.

It is an object of the present invention to provide a new and improved system for measuring and recording pressure signatures of vessels.

Another object is to provide a pressure measuring and recording system having provision for converting pressure changes to a voltage proportional to the rate of change of the amplitude-time functions of the pressure changes and for integrating and recording the voltage as a measure of the pressure changes.

Another object is to provide a new and improved system of the aforedescribed character having provision for converting pressure changes to flux changes and recording and calibrating the flux changes to provide readings of the pressure changes.

Another object is to provide a new and improved pressure measuring and recording system in which flux changes are produced in an electromagnetic circuit in response to variations in pressure and a recording fluxmeter is employed to measure the flux changes and provide calibrated pressure readings corresponding thereto.

A further object is to provide a new and improved pressure measuring and recording system including a recording fluxmeter and a pressure sensing device adapted to produce flux changes proportional to pressure variations applied thereto and to generate a voltage in response to the flux changes suitable for controlling the fluxmeter.

Still other objects, features and advantages of the present invention will become more clearly apparent from the following detailed description of the preferred embodiment of the invention and the operations thereof, reference being had to the accompanying drawings in which.

Figure 1:
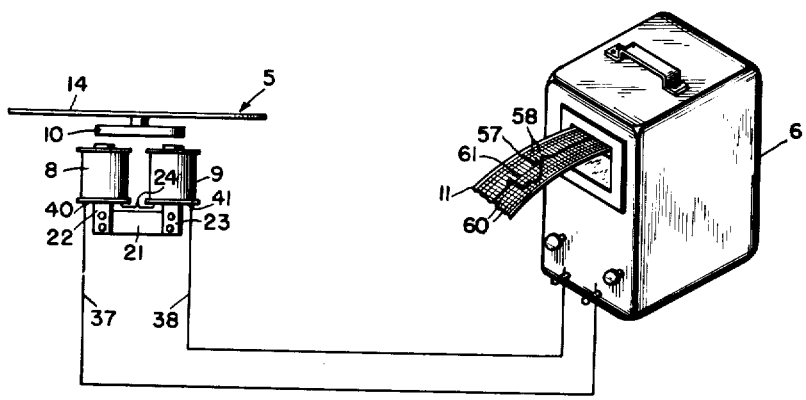
FIG. 1 is a schematic view of the invention illustrating the electrical hookup between the powerphone and fluxmeter.

FIG. 1 shows an assembly of parts according to the present invention with the powerphone or undersea pickup 5 electrically connected to the fluxmeter 6 by a pair of leads 37 and 38. The leads provide means for communicating current generated within the coils 8 and 9, by the movement of the armature 10 relative thereto, to the fluxmeter where it is transcribed into pressure readings of proportional value and recorded on the moving tape 11. The duration of such pressure changes can be easily determined by calibrating the tape into segments of a predetermined value relative to the speed at which the tape is known to move beneath the recording stylus.

Figure 2:
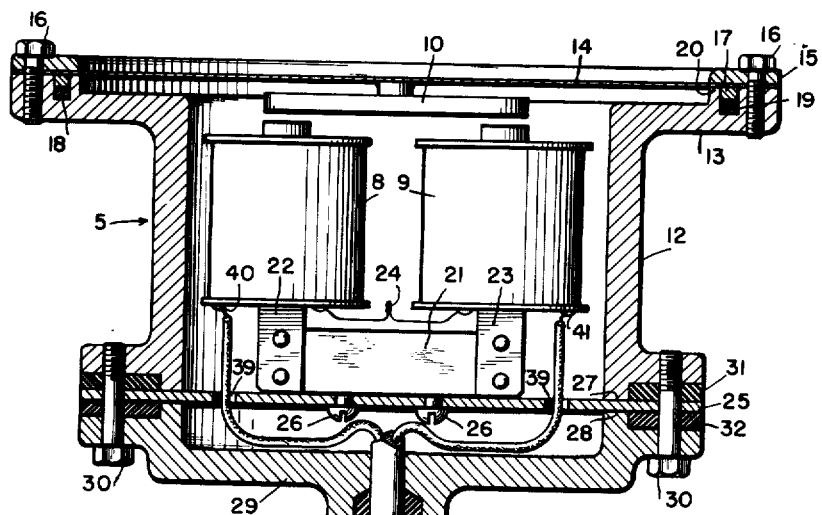
FIG. 2 is a partly sectional and partly elevational view of the powerphone.

A more detailed structure of the powerphone is shown in FIG. 2 wherein the casing or housing 12 is formed as a cylindrical casting suitably flanged at 13 for receiving the proportionally large flexible diaphragm 14 that is adapted to be secured thereto by the clamp ring 15. This ring is brought to bear on the diaphragm by the application of bolts 16 circularly arranged thereabout and threadedly connected with the extending flange 13 of the housing, substantially as shown. The diaphragm is provided with a positioning ring 17 preferably furnace brazed thereto and adapted to fit within the annular groove 18 formed within the face of the flange 13 for compressing the resilient washer 19 and thereby establishing a water-tight seal between the diaphragm and housing after assembly. It will be noted that after properly compressing the resilient sealing washer 19, the diaphragm 14 is brought to bear on the shoulder 20 that accurately positions the diaphragm with respect to the other parts of the device. The significance of this arrangement will be more fully apparent as the description proceeds.

Centrally affixed to the inner face of the diaphragm 14 and adapted to be moved thereby in response to pressure applied thereto, is the armature 10 which is preferably formed of material such as Permalloy. This armature is adapted to be moved by the diaphragm within the magnetic circuit set up by the permanent magnet 21 mounted between the two cores 22 and 23 also of Permalloy and over which is wound the coils 8 and 9 respectively. These coils are wired in series as shown by the connection 24, FIG. 2. The magnet and coil assembly is supported centrally within the housing by means of the circular mounting plate 25 to which it is secured by screws 26. The plate 25 is rigidly held between the positioning flanges 27 and 28 of the housing and base cap 29 respectively by the bolts 30, with the resilient washers 31 and 32 arranged on either side of the plate so as to be compressed by the tightening of the bolts thereby to establish a watertight seal between the members after the assembly thereof.

Current generated within the coils 8 and 9 is transmitted from the powerphone by way of the waterproof cable 33 that enters the housing through the gland nut assembly 34, the resilient washer 35 thereof forming a seal by compressing about the cable upon the tightening of the nut 36. The two conductors 37 and 38 of the cable pass through openings 39 formed within the mounting plate 25 and connect with the terminals of the coils at 40 and 41 in the manner shown.

To understand better the operation of the present invention it will be recalled that an electromotive force is induced in a coil whenever the magnetic field within the coil is varied. In other words, whenever there is a change in magnetic flux passing through a coil there is an electromotive force induced in the coil and the magnitude of this force is proportional to the number of turns of wire in the coil and proportional to the rate of change of flux. In the powerphone shown in FIG. 2, it will be noted that the permanent magnet 21 is arranged in abutting relation to the Permalloy cores 22 and 23 of the coils 8 and 9 respectively and thereby sets up a magnetic circuit or field within these coils so that a current is generated therein by the movement of the armature 10 within this magnetic field or circuit responsive to the flexing of the pressure responsive diaphragm to which the armature is attached. The coils 8 and 9 are mounted within the housing 12 so that an air gap of about 0.040 inch is left between the ends of the cores and the movable armature 10. This air gap changes with pressure changes on the diaphragm and thereby changes the inductance of the coils whereby, in the arrangement disclosed, the inductance is a function of the pressure applied to the diaphragm.

This function is nonlinear and depends primarily on the behavior of the two systems involved, namely the deflection of the diaphragm with pressure and the increase of inductance with the decrease of the air gap. As is well known the flexibility of a diaphragm decreases as the pressure applied thereto increases and, on the other hand, induction within the coils increases as the air gap between the armature and the pole pieces decreases. By a proper choice of air gap, these two nonlinear characteristics may be balanced against each other so as to obtain an approximately overall linear relationship between applied pressure and change of inductance. With the air gap so adjusted the sensitivity of the unit is practically independent of depth of submersion thereof and the sensitivity may be held constant throughout the working range of the device.

The voltage induced in coils 8 and 9 is directly proportional to the rate of change of flux therethrough. The fluxmeter 6, FIG. 1, preferably is of a well known photo-electric recording type having a moving coil system without a return or restoring torque acting thereon whereby the fluxmeter integrates the voltage induced in the coils of the powerphone and the pen of the fluxmeter takes and holds settings corresponding to the changes in the instant value of the flux through the coils. The changes in flux through the coils are proportional to the changes in pressure acting on the diaphragm and, thus, the fluxmeter may be calibrated to provide readings of the pressure changes.

Figure 3:
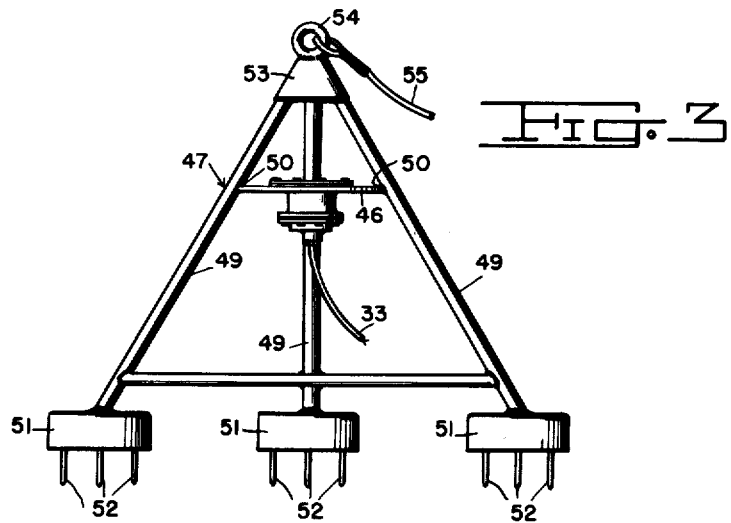
FIG. 3 is an elevational view of the powerphone suspended within a tripod suitable for use in anchoring the device to the ocean bottom.

FIG. 3 illustrates one suitable method of mounting the powerphone for taking readings on the ocean bottom. The device is suspended through a circular opening provided in the plate 46 forming part of the tripod assembly 47. The plate 46 is welded or otherwise suitably secured to the legs 49 of the tripod at 50. The feet 51 are preferably of lead cast around the lower portion of the legs substantially as shown within which is arranged a number of spikes 52 adapted to hold the tripod firmly in place when properly arranged upon the ocean bottom.

The cap piece 53 is provided with a ring portion 54 to which is attached the flexible cable 55 by which the entire unit 47 may be lowered to the ocean bed or raised from the water.

Figure 4:
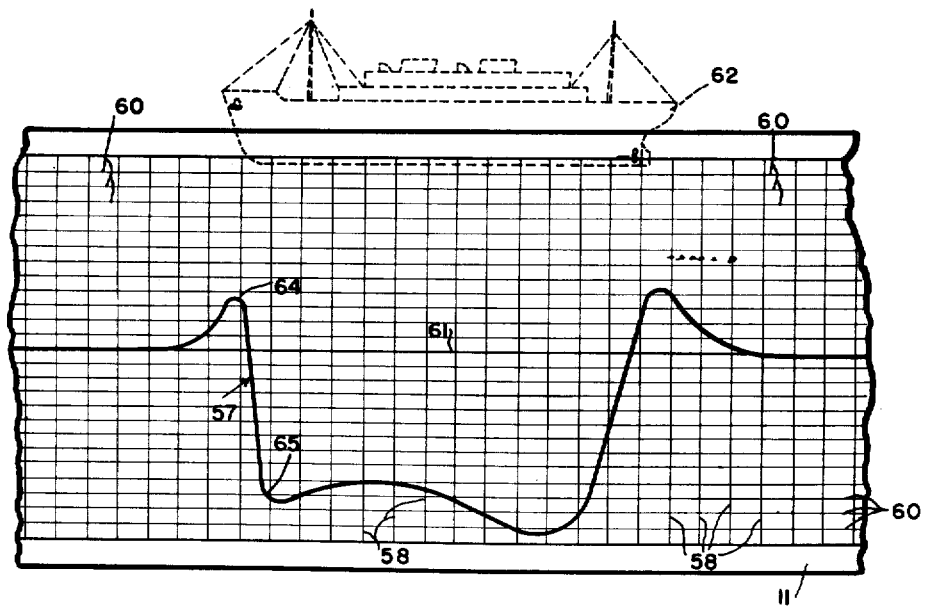
FIG. 4 is a section of tape on which is recorded the pressure signature of a vessel moving at a known number of feet above the powerphone.

FIG. 4 shows a section of tape upon which has been recorded, by the fluxmeter, the pressure signature 57 of a moving vessel. The cross-section lines 58 represent predetermined intervals of time calibrated relative to the movement of the tape through the meter, while the longitudinal lines 60 thereof are calibrated into pressure variations from the static head line 61. The dash outline 62 of the ship relative to the pressure curve 57 is shown merely for the purpose of associating points on the curve with respect to the corresponding portion of the ship's hull. It will be noted from the signature that the pressure at point 64 just ahead of the bow of the ship is momentarily increased and rapidly decreases at 65 as the bow of the ship passes over the fixed point of reference, the negative pressure being maintained for substantially the period of time necessary for the passing of the vessel over the point of reference.

Figure 5:
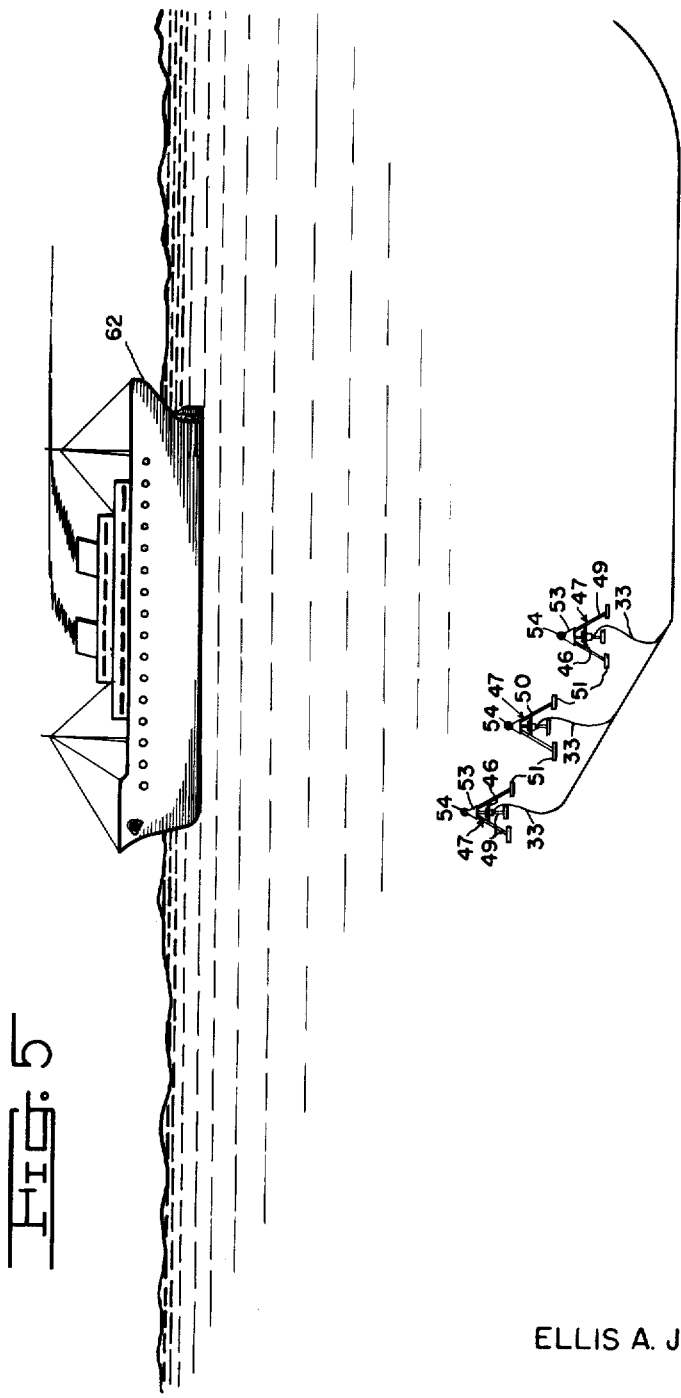
FIG. 5 illustrates one method of arranging a plurality of power phones of the present invention for simultaneously recording a plurality of pressure signatures beneath a moving ship.

To obtain a more accurate overall pattern of the pressure signature of a moving vessel 62 it has been found necessary to have several units of the type shown in FIG. 3 systematically placed along the ocean bed as illustrated in FIG. 5 with a two conductor cable 33 leading from each unit to a plurality of fluxmeters 6 respectively connected thereto and usually located at a nearby observation station.

It is understood that any number of variations in arrangements and structure may be resorted to without departing from the spirit and scope of the present invention and it is intended, therefore, in the appended claims to cover all such variations.

The invention herein described and claimed may be manufactured and used by or for the Government of the United States of America for governmental purposes without payment of any royalties thereon or therefor.

What is claimed as new and desired to be secured by Letters Patent of the United States is:

1. A system for measuring and recording the pressure signature of a vessel traversing a body of water comprising, in combination, a hollow casing for disposition within said body of water, said casing having an open side and a pair of insulated conductors sealingly extending through an aperture in said casing for providing electrical communication with the interior of said casing, a flexible diaphragm conformingly seated in said open side for closing said casing to define a sealed chamber therewithin, said diaphragm flexing in a manner corresponding to the pressure variations of the water surrounding said casing when within said body of water, means including a permanent magnet fixedly disposed within said chamber for setting up a magnetic field therewithin, a pair of magnetic cores disposed within said field and mutually spaced to define a pair of coplanar faces, an individual coil wound on each of said cores, circuit connections for serially connecting the coils in series across said pair of conductors, an armature of magnetic material having a plane surface disposed in equi-spaced face adjacency to said coplanar faces and movable by flexures of said diaphragm in planes parallel to the plane of said faces for changing the magnetic flux through said coils thereby to generate electrical signals proportional to the time rate of change of said flux, said plane surface normally lying in a plane parallel to said coplanar faces and at such preselected distance therefrom as to obtain an approximately overall linear relationship between the pressure applied to said diaphragm and change of flux in said coils, to thereby substantially nullify the flux effects caused by pressures arising from varying depths of submersion of said casing in the body of water and render said system sensitive to substantially only flux variations produced by pressures generated by a vessel traversing said body of water, said preselected distance being determined by balancing the known rate of decreasing flexibility of the diaphragm, as the applied pressure increases, against the known rate of increasing induction within the coils as said plane surface moves toward said coplanar faces, and a recording fluxmeter located at a point remote from the situs of said casing and connected to said pair of conductors to receive said generated electrical signals, said fluxmeter being operable to integrate said signals and develop therefrom indicia representative of the pressure signature of a vessel traversing said body of water.

2. In a system for measuring and recording variations in pressure produced by a moving vessel within a body of water, the combination of a hollow housing having an open side and a watertight gland nut assembly, a pair of insulated conductors entering the housing through said assembly for providing electrical communication with the interior thereof, a flexible diaphragm conformingly seated in said open side for closing said housing to define a sealed chamber therewithin, said diaphragm having one side thereof exposed to the surrounding water and adapted to be flexed proportionately to changes in the pressure of the water, a pair of inductance coils wound on individual cores which are mutually spaced within said chamber to define a pair of coplanar faces, a permanent magnet interposedly connected to said cores to form a magnetic assemblage for setting up a magnetic field through said coils, means for rigidly securing said assemblage within said chamber, circuit connections for connecting said coils in series across said pair of conductors, an armature of magnetic material having a plane surface disposed in equi-spaced face adjacency to said coplanar faces to form a pair of equal gaps between said coplanar faces and said plane surface, said armature being carried by said diaphragm for movement in response to flexures thereof, movement of said plane surface being in planes parallel to the plane of said faces to thereby equally vary said pair of gaps whereby said magnetic field is varied to induce voltages in said coils proportional to the rate of movement of said diaphragm, the normal dimension of said pair of equal gaps being so preselected as to provide a substantially overall linear relationship between the pressure applied to the diaphragm and the change of flux in said coils, to thereby substantially nullify the flux effects introduced by varying pressures resulting from various depths of submersion of said housing in the body of water and render said assemblage effective to induce voltages in said coils resulting substantially only from flux variations produced by pressures generated by a vessel moving within said body of water, said preselected dimension being determined by balancing the known rate of decreasing flexibility of the diaphragm, as the applied pressure increases, against the known rate of increasing induction within the coils as said gaps decrease, and an electroresponsive integrating and recording device located at a point remote from the situs of said housing and connected to said pair of conductors to receive said induced voltages, said device being operable to integrate the received voltages and develop therefrom indicia representative of the pressure signature of a vessel.

References Cited in the file of this patent

UNITED STATES PATENTS

| | | |
|---|---|---|
| 1,255,034 | Mason | Jan. 29, 1918 |
| 1,718,494 | Schurig | June 25, 1929 |
| 2,361,738 | Bird | Oct. 31, 1944 |
| 2,509,210 | Clark | May 30, 1950 |

FOREIGN PATENTS

| | | |
|---|---|---|
| 139,211 | Great Britain | Sept. 23, 1920 |
| 339,149 | Great Britain | Dec. 4, 1940 |
| 559,149 | Great Britain | Feb. 7, 1944 |